Oct. 19, 1965     P. B. FONDEN ETAL     3,212,727
DEVICE FOR AIRCRAFT-ARRESTING ELEMENTS
Filed Feb. 12, 1963     2 Sheets-Sheet 1

PER BORJE FONDEN ET AL
INVENTOR.
BY ERIC Y. MUNSON,
Attorney

Oct. 19, 1965 P. B. FONDEN ETAL 3,212,727
DEVICE FOR AIRCRAFT-ARRESTING ELEMENTS
Filed Feb. 12, 1963 2 Sheets-Sheet 2

PER BORJE FONDEN ET AL
INVENTOR.

BY ERIC Y. MUNSON,
Attorney

United States Patent Office 3,212,727
Patented Oct. 19, 1965

3,212,727
DEVICE FOR AIRCRAFT-ARRESTING ELEMENTS
Per Borje Fonden, Hejdegatan 3, and Karl Ove Torgny
  Walander, Vasavagen 49, both of Linkoping, Sweden
Filed Feb. 12, 1963, Ser. No. 258,002
Claims priority, application Sweden, Feb. 13, 1962,
1,550/62
3 Claims. (Cl. 242—117)

The present invention relates to a device for aircraft-arresting elements, such as nets, wires, etc. connected to arresting wires or bands arranged to unwind from brake drums.

When an aircraft is arrested upon landing, the brake drums accelerate to a very high speed. Considerable acceleration forces arise owing to the acceleration of the drums to peripheral speeds that correspond approximately to the ground speed of the aircraft. Attempts have been made to design arresting wires and brakes of minimum weight in order to reduce acceleration forces. These attempts have not been wholly successful as it is not possible to reduce the weight of the wires or bands without having to resort to special measures that complicate the device and make it operationally less reliable. Whatever design a drum may have, there is always a certain maximum speed above which the acceleration forces become excessive. More sturdy constructions are of no avail as the inertia forces are increased accordingly.

The present invention has avoided these difficulties and is characterized mainly by the following features: the drum is radially diametrically increased at the end from which the wire begins to unwind so that the first convolution or convolutions unwinds from a greater radius than the following convolutions. This arrangement reduces the initial forces acting on the drum when the arresting wire takes up the strain.

A further advantage is gained by the drum radius being reduced after the first few coils have been unwound, whereby the acceleration forces are increased and dangerous acceleration peaks are smoothed out. Frequently, when arresting an aircraft that lands at high speed, there is an initial jerk of very short duration. When the aircraft is caught by the arresting gear, which consists of one or more wires, a powerful wave, mainly transversal but also longitudinal, is set up within the arresting device. When this wave reaches the brake drums, a short, violent jerk results.

With these and other objects to be hereinafter set forth in view, I have devised the arrangement of parts to be described and more particularly pointed out in the claims appended hereto.

In the accompanying drawings, wherein illustrative embodiments of the invention are disclosed, FIG. 1 is a perspective view, partly in section of a drum constructed according to the invention, and with a wire or cable wound on it;

Figure 1:
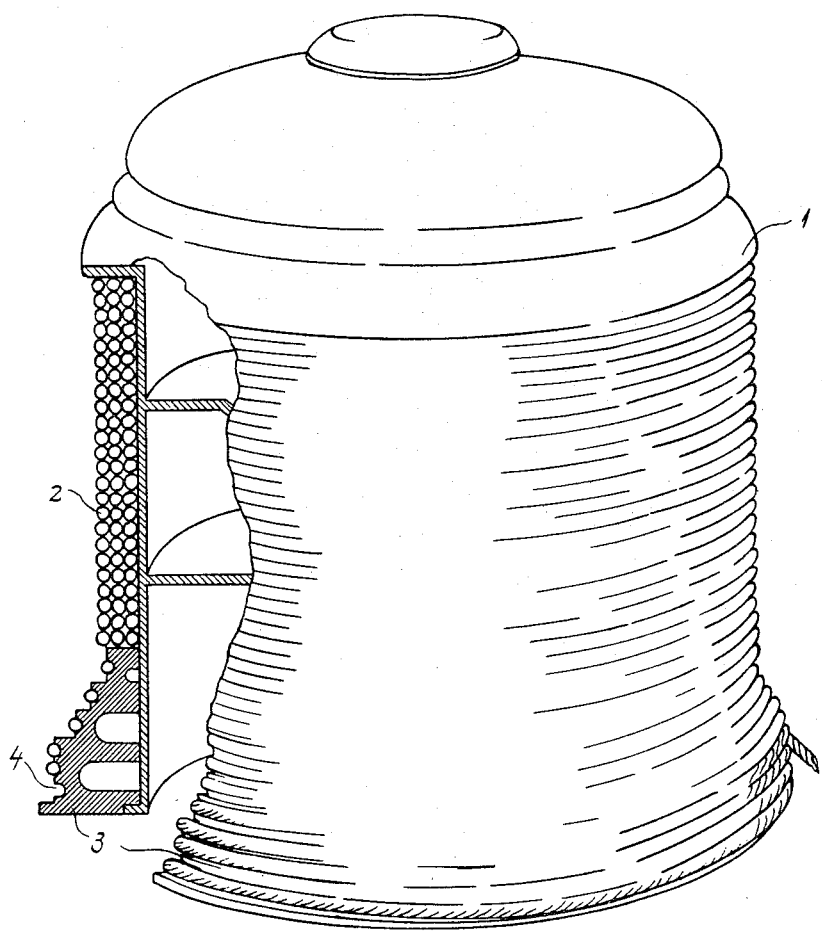

Referring to FIG. 1, there is therein shown a drum 1, coupled to a brake (not shown) in the conventional manner. The end of the drum from which the wire first unwinds when arresting an aircraft, is shown at the lower part of the figure, and such end is radially built-out or diametrically increased and consists of an annular, grooved drum section 3 provided with a helical groove 4 to accommodate the wire, and with a radius which progressively decreases from the end where the unwinding begins. FIG. 1 shows several layers of the wire coiled around the cylindrical part of the drum, but in some cases however, one layer is used.

Figure 2:
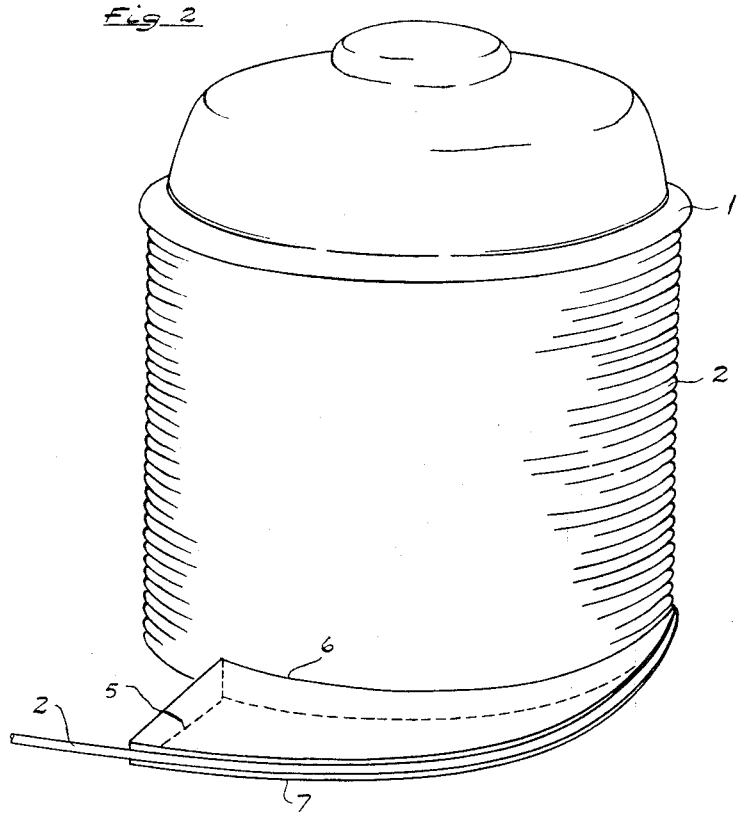
FIG. 2 is a similar view of another embodiment of the invention.

In FIG. 2 is shown a cylindrical drum 1 wound with one or more layers of wire. In this embodiment, the radially built-out section comprises a detachable component or segment 5 clamped between the drum and that part of the wire or band 2 which unwinds first from the drum. The element 5 has an inner edge 6 curved to fit against the adjacent surface of the drum, and an outer edge 7 with a progressively increasing width toward the unwinding end. No tools are required to detach the element 5. The element 5 is maintained in position by the tension of the cable and by consequent friction. It is freed automatically and is projected by centrifugal force when the drum has rotated a certain number of revolutions to the point where the element 5 is no longer pinched between the drum and the cable.

Figure 3:
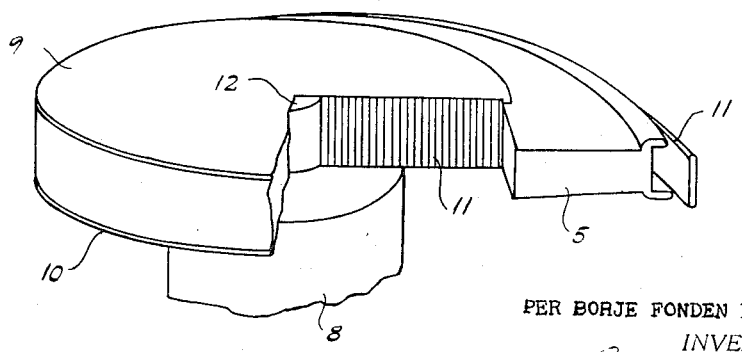
FIG. 3 shows the invention as applied to an arresting brake band.

In FIG. 3 is shown in another embodiment of the invention, a brake 8 coupled to a drum with discs 9 and 10, between which there is an arresting band 11 wound several times around a shaft 12 which is a part of the brake. The element or component 5, which is structurally similar to the component shown in FIG. 2, is fitted between the outgoing end of the band and the outer layer of the coiled band, whereby the torque on shaft 12, exerted by a certain tension in the outgoing belt, is reduced in proportion to the increased radius. Other arrangements than those shown here, which employ a fixed radially built-out section or a detachable element such as that shown at 5, are possible.

Having thus described several embodiments of the invention, it is obvious that the same is not to be restricted thereto, but is broad enough to cover all structures coming within the scope of the annexed claims.

What we claim is:

1. A device for use in aircraft arresting apparatus comprising; a rotatable drum, an arresting means partially wound upon the drum, one extremity of the wound portion of said arresting means merging with an unwound section of the arresting means, a radially extending detachable member positioned between and contacting segments of both the unwound section and said one extremity of the wound portion, the radial length of said detachable member increasing as it extends from the point at which the wound portion and the unwound section merge, the portion of the detachable member contacting said unwound section having a radius which increases from a minimum where the wound portion and the unwound sections merge to a maximum at the opposed end of the detachable member whereby, when the drum is subjected to initial rotation by said arresting means, the initial forces acting on and the acceleration of the drum are reduced.

2. The device as set forth in claim 1 wherein the arresting means is helically wound along the drum and the inside surface of said detachable member is provided with surfaces curved to fit the helically wound arresting means.

3. The device as set forth in claim 1 wherein the arresting means is of rectangular cross-sectional configuration and radially wound on the rotatable drum and the inside surface of the detachable member is provided with a surface to fit the arresting means.

References Cited by the Examiner
UNITED STATES PATENTS

| | | | |
|---|---|---|---|
| 821,708 | 5/06 | Edward | 242—117 |
| 871,687 | 11/07 | Frink | 242—117 |
| 2,599,926 | 6/52 | Le Bus | 242—117 |
| 2,855,162 | 10/58 | Schacht | 242—117 |

MERVIN STEIN, *Primary Examiner.*